United States Patent
Tsujii et al.

(10) Patent No.: US 11,655,310 B2
(45) Date of Patent: May 23, 2023

(54) FINE CELLULOSE FIBER, PRODUCTION METHOD THEREOF, SLURRY, AND COMPOSITE

(71) Applicants: Kyoto University, Kyoto (JP); DAIO PAPER CORPORATION, Shikokuchuo (JP)

(72) Inventors: Yoshinobu Tsujii, Kyoto (JP); Keita Sakakibara, Kyoto (JP); Koji Tanaka, Ichihara (JP); Takahito Ikuma, Sakura (JP); Junya Okawa, Shikokuchuo (JP); Ikko Matsusue, Shikokuchuo (JP)

(73) Assignees: KYOTO UNIVERSITY, Kyoto (JP); DAIO PAPER CORPORATION, Ehime (JP)

( * ) Notice: Subject to any disclaimer, the term of this patent is extended or adjusted under 35 U.S.C. 154(b) by 293 days.

(21) Appl. No.: 16/622,475

(22) PCT Filed: Jun. 13, 2018

(86) PCT No.: PCT/JP2018/022557
§ 371 (c)(1),
(2) Date: Dec. 13, 2019

(87) PCT Pub. No.: WO2018/230600
PCT Pub. Date: Dec. 20, 2018

(65) Prior Publication Data
US 2020/0115471 A1  Apr. 16, 2020

(30) Foreign Application Priority Data

Jun. 14, 2017 (JP) .............................. JP2017-116549

(51) Int. Cl.
C08B 15/06 (2006.01)
C08L 1/10 (2006.01)
D06M 13/432 (2006.01)
D06M 101/06 (2006.01)

(52) U.S. Cl.
CPC ............... *C08B 15/06* (2013.01); *C08L 1/10* (2013.01); *D06M 13/432* (2013.01); *D06M 2101/06* (2013.01)

(58) Field of Classification Search
CPC ........................................................ C08L 1/08
See application file for complete search history.

(56) References Cited

U.S. PATENT DOCUMENTS

| | | | | |
|---|---|---|---|---|
| 4,404,369 A | * | 9/1983 | Huttunen ................ | C08B 15/06 536/30 |
| 5,840,787 A | * | 11/1998 | West ...................... | D21H 17/28 524/35 |
| 2013/0025920 A1 | * | 1/2013 | Shimizu .................. | C08L 1/02 174/258 |
| 2016/0168363 A1 | * | 6/2016 | Nelson ..................... | C08L 1/04 428/35.7 |
| 2017/0145119 A1 | * | 5/2017 | Saxell .................... | C08B 15/06 |
| 2019/0211163 A1 | * | 7/2019 | Ito ........................... | C08L 1/286 |
| 2019/0382948 A1 | * | 12/2019 | Matsusue ............... | D06M 11/70 |
| 2020/0063292 A1 | * | 2/2020 | Matsusue ................ | D01F 1/10 |
| 2020/0131279 A1 | * | 4/2020 | Fushimi ................. | D21H 21/06 |
| 2021/0156090 A1 | * | 5/2021 | Matsusue ................ | C08L 1/16 |

FOREIGN PATENT DOCUMENTS

| | | |
|---|---|---|
| CN | 1625568 A | 6/2005 |
| CN | 106661131 A | 5/2017 |
| JP | 48-099280 A | 12/1973 |
| JP | 57-143301 A | 9/1982 |
| JP | 58-502216 A | 12/1983 |
| JP | 58-502217 A | 12/1983 |
| JP | 60-123502 A | 7/1985 |
| JP | 60-210601 A | 10/1985 |
| JP | 60-226831 A | 11/1985 |
| JP | 61-254604 A | 11/1986 |
| JP | 1-190701 A | 7/1989 |
| JP | 9-99238 A | 4/1997 |
| JP | 11-513425 A | 11/1999 |
| JP | 2000-505135 A | 4/2000 |
| JP | 2001-172302 A | 6/2001 |
| JP | 2002-148247 A | 5/2002 |
| JP | 2005-029574 A | 2/2005 |
| JP | 2005-525437 A | 8/2005 |
| JP | 2010-090311 A | 4/2010 |
| JP | 2010-235757 A | 10/2010 |
| JP | 2010-235758 A | 10/2010 |
| JP | 2010-235905 A | 10/2010 |
| JP | 2012-214563 A | 11/2012 |
| JP | 2012-229350 A | 11/2012 |
| JP | 2016-056268 A | 4/2016 |
| JP | 2016-155884 A | 9/2016 |
| JP | 2016-222786 A | 12/2016 |
| JP | 2017-66272 A | 4/2017 |
| WO | 1992/015616 A1 | 9/1992 |
| WO | 2015/198218 A1 | 12/2015 |
| WO | 2016/143760 A1 | 9/2016 |

OTHER PUBLICATIONS

Siro et al. (Cellulose (2010) 17:459-494) (Year: 2010).*
Office Action dated Jul. 6, 2021, issued in counterpart JP application No. 2017-116549, with English translation. (6 pages).
Extended European Search Report dated Feb. 9, 2021, issued in counterpart EP Application No. 18816788.6. (5 pages).

* cited by examiner

*Primary Examiner* — Liam J Heincer
(74) *Attorney, Agent, or Firm* — WHDA, LLP (57) ABSTRACT

Provided are: a fine cellulose fiber that is superior in handling properties and that can suitably be used as a reinforcing material or the like for resin; a production method of the fine cellulose fiber; and a slurry and a composite comprising the fine cellulose fibers. The present invention pertains to fine cellulose fibers comprising a carbamate group. The degree of substitution with the carbamate group with respect to hydroxy groups in the fine cellulose fibers is preferably no less than 0.05 and no greater than 0.5. The present invention pertains to a slurry comprising the fine cellulose fibers, to a composite comprising the fine cellulose fibers and a resin, and to a production method of the fine cellulose fibers, comprising performing a heat treatment on a mixture of a plant raw material and urea or the like, and performing a miniaturization treatment of the plant raw material.

7 Claims, 5 Drawing Sheets

FINE CELLULOSE FIBER, PRODUCTION METHOD THEREOF, SLURRY, AND COMPOSITE

TECHNICAL FIELD

The present invention relates to a fine cellulose fiber, a production method thereof, a slurry, and a composite.

BACKGROUND ART

In recent years, nanotechnology for miniaturizing a substance to a nanometer level with an aim of obtaining new properties of the substance different from the characteristics inherent to the substance has been of great interest. Fine cellulose fibers such as cellulose nanofibers (hereinafter, may be also referred to as "CNFs") produced from pulp, which is a cellulose-based raw material, through chemical, milling, or other treatments are anticipated for industrial applications, such as filter materials, filter aids, ion exchanger base materials, filling materials for chromatographic analysis equipment, filling agents to be mixed with a resin or rubber, and for applications as a compounding agent of cosmetic products, such as lipsticks, powder cosmetics and emulsified cosmetics, due to superior strength, elasticity, thermal stability, and the like of the fine cellulose fibers. In addition, CNFs and the like are anticipated for use in many other applications including viscosity maintaining agents for food, cosmetic products, paints and the like, and strengthening agents for food dough raw materials, water retention agents, food stabilizing agents, low-calorie additives, emulsifying stabilizing aids, and the like.

Use of CNFs or the like as a reinforcing material for a thermoplastic resin has been suggested among such applications. In order for CNFs and the like to demonstrate the resin reinforcing effect, they need to be dispersed in the resin while being prevented from aggregation. In attempts to prevent the aggregation of CNFs or the like, which serve as a reinforcing material, techniques of using surface-modified CNFs have been developed (see, Patent Documents 1 to 5). In the patent documents 1 to 3, the reinforcing effect on a resin is exhibited through surface-modifying fine cellulose fibers. The surface-modifying agent, however, has such problems as being deactivated in water or reacting extremely slowly in water. Thus, the surfaces of fine cellulose fibers have to be modified in an organic solvent, which involves problems such as solvent disposal. In the patent documents 4 and 5, a carbamate is introduced into cellulose using urea, and the cellulose is used as a water treatment absorbent, a sponge, etc. However, the reinforcing effect on a resin has been unknown to this point.

In addition, since CNFs and the like have many hydroxy groups, it is difficult to mix them with a resin or the like homogeneously. Furthermore, due to having many hydroxy groups, CNFs and the like will have an extremely high viscosity when dispersed into water to be slurried. Accordingly, CNFs and the like are desired to be further improved from the perspective of handling, etc.

PRIOR ART DOCUMENTS

Patent Documents

Patent Document 1: Japanese Unexamined Patent Application, Publication No. 2012-229350
Patent Document 2: Japanese Unexamined Patent Application, Publication No. 2012-214563
Patent Document 3: Japanese Translation of PCT International Application Publication No. 11-513425
Patent Document 4: Japanese Unexamined Patent Application, Publication No. 2001-172302
Patent Document 5: Japanese Unexamined Patent Application, Publication No. 9-99238

SUMMARY OF THE INVENTION

Problems to be Solved by the Invention

The present invention was made in view of the foregoing circumstances, and an object of the present invention is to provide: fine cellulose fibers that are superior in handling properties and that can suitably be used as a reinforcing material for a resin or the like; a production method for the fine cellulose fibers; and a slurry and a composite comprising the fine cellulose fibers.

Means for Solving the Problems

A first aspect of the invention made for solving the aforementioned problems is a fine cellulose fiber comprising a carbamate group.

The fine cellulose fiber comprises a carbamate group, thereby enabling lower hydrophilicity of the fine cellulose fiber compared with that of conventional fine cellulose fibers, whereas an affinity of the fine cellulose fiber to a less polar resin or the like is higher as compared with that of conventional fine cellulose fibers. Thus, fine cellulose fibers which may be involved in the first aspect of the invention are superior in the ability to homogeneously disperse in a resin. In addition, the slurry of the fine cellulose fibers has lower viscosity compared with that of the slurries of the conventional fine cellulose fibers. Accordingly, the fine cellulose fibers are superior in handling properties and can suitably be used as a reinforcing material or the like for a resin.

A degree of substitution with a carbamate group with respect to hydroxy groups in the fine cellulose fibers is preferably no less than 0.05 and no greater than 0.5. By virtue of the degree of substitution falling within the above range, handling properties can be sufficiently improved while preventing production costs from increasing.

Another aspect of the invention made for solving the aforementioned problems is a slurry comprising the fine cellulose fiber of the first aspect of the invention. The slurry is superior in handling properties due to relatively low viscosity, and the like. In addition, the slurry has relatively high drying efficiency since fine cellulose fibers in which hydroxy groups are substituted with carbamate groups are included.

Still another aspect of the invention made for solving the aforementioned problems is a composite comprising the fine cellulose fiber of the first aspect of the invention and a resin. The composite comprises fine cellulose fibers comprising carbamate groups. The fine cellulose fibers, due to their ability to be dispersed highly homogeneously in the resin, can have high strength and the like.

Still another aspect of the invention made for solving the aforementioned problems is a production method of a fine cellulose fiber, comprising: performing a heat treatment on a mixture of a plant raw material and urea or a urea derivative; and performing a miniaturization treatment of the plant raw material.

According to the aforementioned production method, a part of hydroxy groups in the cellulose, which is the principal component of the plant raw material, reacts with urea or a urea derivative in the heat treatment step, and at least a part of the hydroxy groups is substituted with carbamate groups. The fine cellulose fibers comprising the carbamate groups, which have been obtained through the heat treatment step, have lower hydrophilicity compared with that of conventional fine cellulose fibers, whereas the fine cellulose fibers have higher affinity to a less polar resin or the like, compared with that of conventional fine cellulose fibers. Thus, the obtained fine cellulose fibers are superior in the ability to homogeneously disperse in resin. In addition, the slurry of the obtained fine cellulose fibers has lower viscosity compared with that of the slurries of the conventional fine cellulose fibers. Accordingly, the production method enables the obtaining of fine cellulose fibers that are superior in handling properties and that can suitably be used as a reinforcing material or the like for a resin.

The production method preferably comprises performing a miniaturization treatment of the plant raw material after performing a heat treatment. By carrying out the heat treatment on plant raw materials with relatively large grain sizes and then carrying out the miniaturization treatment, modified fine cellulose fibers can be efficiently obtained. This is because a plant raw material before the miniaturization treatment, such as pulp, has high dehydrating efficiency as described above, and defibration of the plant raw material is more likely to occur after the heat treatment, thereby enabling the miniaturization treatment to be effectively carried out.

The heat treatment step is preferably performed at no less than 120° C. and no greater than 200° C. Carrying out the heat treatment within the aforementioned temperature range can effectively cause the reaction of cellulose with urea or a urea derivative.

The heat treatment step is preferably performed under an acidic condition. This can effectively cause the reaction of cellulose with urea or a urea derivative.

The fine cellulose fiber is used preferably as a reinforcing material for a resin. As described above, the fine cellulose fibers obtained by the production method are superior in handling properties and can suitably be used as a reinforcing material to be mixed and used with the resin.

The "fine cellulose fiber(s)" as referred to herein means fine cellulose fiber(s) that are/is obtained by defibrating a plant raw material such as pulp and that have/has a fiber diameter of no less than 1 nm and no greater than 15 μm and/or freeness of no greater than 100 cc.

Effects of the Invention

According to the aspects of the present invention, fine cellulose fibers that are superior in handling properties and that can suitably be used as a reinforcing material or the like for a resin, a production method of the fine cellulose fibers, and a slurry and a composite comprising the fine cellulose fibers can be provided.

DESCRIPTION OF EMBODIMENTS

Hereinafter, fine cellulose fibers, a production method thereof, and a slurry and a composite according to embodiments of the present invention are described in detail with appropriate reference to drawings.

Fine Cellulose Fibers

Fine cellulose fibers according to an embodiment of the present invention have carbamate groups. The carbamate group is a group represented by —O—CO—NH—, and may be a group represented by —O—CO—NH$_2$, —O—CO—NHR, —O—CO—NR$_2$, or the like, wherein R each independently represents a saturated linear hydrocarbon group, a saturated branched-chain hydrocarbon group, a saturated cyclic hydrocarbon group, an unsaturated linear hydrocarbon group, an unsaturated branched-chain hydrocarbon group, an aromatic group, or a group derived therefrom (i.e., derivative group). In the fine cellulose fibers, a part of hydroxy groups being highly polar are substituted with a carbamate group being relatively less polar. Accordingly, the fine cellulose fibers have lower hydrophilicity compared with that of conventional fine cellulose fibers, whereas the fine cellulose fibers have higher affinity to a less polar resin or the like than that of conventional fine cellulose fibers. Thus, the fine cellulose fibers are superior in the ability to homogeneously disperse in resin. In addition, slurries of the fine cellulose fibers have lower viscosity compared with the slurries of conventional fine cellulose fibers.

Examples of the saturated linear hydrocarbon group include linear alkyl groups having 1 to 10 carbon atoms such as a methyl group, an ethyl group, and a propyl group.

Examples of the saturated branched-chain hydrocarbon group include branched-chain alkyl groups having 3 to 10 carbon atoms such as an isopropyl group, a sec-butyl group, an isobutyl group, and a tert-butyl group.

Examples of the saturated cyclic hydrocarbon group include cycloalkyl groups such as a cyclopentyl group, a cyclohexyl group, and a norbornyl group.

Examples of the unsaturated linear hydrocarbon group include linear alkenyl groups having 2 to 10 carbon atoms such as an ethenyl group, a propene-1-yl group, and a propene-3-yl group; linear alkynyl groups having 2 to 10 carbon atoms such as an ethynyl group, a propyne-1-yl group, and a propyne-3-yl group; and the like.

Examples of the unsaturated branched-chain hydrocarbon group include branched-chain alkenyl groups having 3 to 10 carbon atoms such as a propen-2-yl group, a buten-2-yl group and a buten-3-yl group; branched alkynyl groups having 4 to 10 carbon atoms such as a butyn-3-yl group; and the like.

Example of the aromatic group include a phenyl group, a tolyl group, a xylyl group, a naphthyl group, and the like.

Examples of the derivative group include a group in which one or a plurality of hydrogen atom(s) in the saturated linear hydrocarbon group, the saturated branched-chain hydrocarbon group, the saturated cyclic hydrocarbon group, the unsaturated liner hydrocarbon group, the unsaturated branched-chain hydrocarbon group, or the aromatic group is/are each substituted with a substituent (for example, a hydroxy group, a carboxy group, a halogen atom, or the like).

Properties and the Like

The lower limit of the average fiber diameter of the fine cellulose fibers observed by an electron microscope is preferably 2 nm, more preferably 20 nm, and still more preferably 100 nm. Further, the lower limit may be 500 nm or 1 μm. On the other hand, the upper limit thereof may be 10 μm or 1 μm, but is preferably 500 nm, more preferably 450 nm, and still more preferably 400 nm. The average length of the fine cellulose fibers is no less than 1 μm and no greater than 5,000 μm, for example.

The freeness of the fine cellulose fibers is preferably no greater than 100 cc. It is to be noted that "freeness" is the Canadian standard water drainage rate as measured in accordance with JIS-P8121-2 (2012).

The lower limit of a degree of substitution with the carbamate group with respect to the hydroxy groups in the fine cellulose fibers is preferably 0.05, more preferably 0.1, and still more preferably 0.2. By setting the degree of substitution to be greater than the lower limit, the aforementioned effects having been obtained by introducing carbamate groups are sufficiently well demonstrated. On the other hand, the upper limit of the degree of substitution is, for example, 1, and is preferably 0.5, but it may be 0.4. Since the fine cellulose fibers having a high degree of substitution increases production costs, keeping the degree of substitution no greater than the upper limit can prevent the production costs from increasing.

It is to be noted that cellulose is a polymer that includes anhydroglucose as a structural unit, and each structural unit has three hydroxy groups. The "degree of substitution with a carbamate group with respect to hydroxy groups" as referred to herein means an average number of hydroxy groups, among the three hydroxy groups in a structural unit of cellulose, having each been substituted with a carbamate group. In other words, the degree of substitution is an average number of carbamate groups per structural unit. Accordingly, the degree of substitution is 3 when all the hydroxy groups are substituted with carbamate groups. The degree of substitution can be derived by quantitative nitrogen determination with the Kjeldahl method. The degree of substitution, as described in Examples below, can be estimated from the ratio of the peak of the carbamate group in the proximity of 1,715 $cm^{-1}$ to the peak of the hydroxy group in the proximity of 3,300 $cm^{-1}$ in the IR spectrum.

The water-holding capacity of the fine cellulose fibers is no less than 200% and no greater than 400%, for example, and may also be set to no greater than 300%. The fine cellulose fibers can achieve a relatively low water-holding capacity since the hydroxy groups are substituted with carbamate groups. This can improve drying efficiency and the like. The water-holding capacity (%) of the fine cellulose fibers is measured in accordance with JAPAN TAPPI No. 26.

The fine cellulose fibers preferably exhibit a single peak on a pseudo particle size distribution curve obtained by a measurement with a laser diffraction method in a state of having been dispersed in water. Such fine cellulose fibers with a single peak have undergone sufficient miniaturization and can demonstrate favorable properties as fine cellulose fibers, which thereby can enhance the strength of molded products, dried bodies, composites, or the like to be obtained. It is to be noted that the particle diameter of the fine cellulose fibers with the single peak (most frequent value) is preferably no less than 5 μm and no greater than 50 μm, for example. With the fine cellulose fibers having the aforementioned sizes, various properties distinctive of fine cellulose fibers can be more favorably demonstrated. The "pseudo particle size distribution curve" means a curve of volume-basis particle size distribution measured by using a particle size distribution measuring apparatus (for example, a particle size analyzer LA-960S, available from HORIBA, Ltd.).

The lower limit of the pulp viscosity of the fine cellulose fibers is preferably 2 cP, and more preferably 4 cP. By setting the pulp viscosity to be greater than the lower limit, the fine cellulose fibers can have a sufficient degree of polymerization and improve their function as a reinforcing material for resin. On the other hand, the upper limit of the pulp viscosity is, for example, 15 cP, and is preferably 6 cP.

In the case in which a concentration of the fine cellulose fibers is 2% by mass, the upper limit of type B viscosity of the dispersion liquid may be 5,000 mPa·s, preferably 4,000 mPa·s, more preferably 3,000 mPa·s, and still more preferably 2,500 mPa·s. The fine cellulose fibers accordingly can achieve relatively low viscosity since the hydroxy groups are substituted with carbamate groups, and have favorable handling properties when they are made into a dispersion liquid (slurry). On the other hand, the lower limit of the type B viscosity may be 1,000 mPa·s, 1,500 mPa·s, or 2,000 mPa·s, for example.

The zeta potential of the fine cellulose fibers, for example, is no less than –100 mV and no greater than –30 mV, preferably no greater than –40 mV, and more preferably no greater than –50 mV. The fine cellulose fibers, having relatively large negative zeta potential, can improve the dispersion stability and the like.

The fine cellulose fibers can suitably be used as a reinforcing material for a resin, filtering material, filter aid, ion exchanger base material, filling material for chromatographic analysis equipment, compounding agent for cosmetic products, viscosity maintaining agent for food and the like, strengthening agent for food dough raw materials, water retention agent, food stabilizing agent, low-calorie additive, emulsifying stabilizing aid, and the like.

Production Method of Fine Cellulose Fibers

Figure 1:
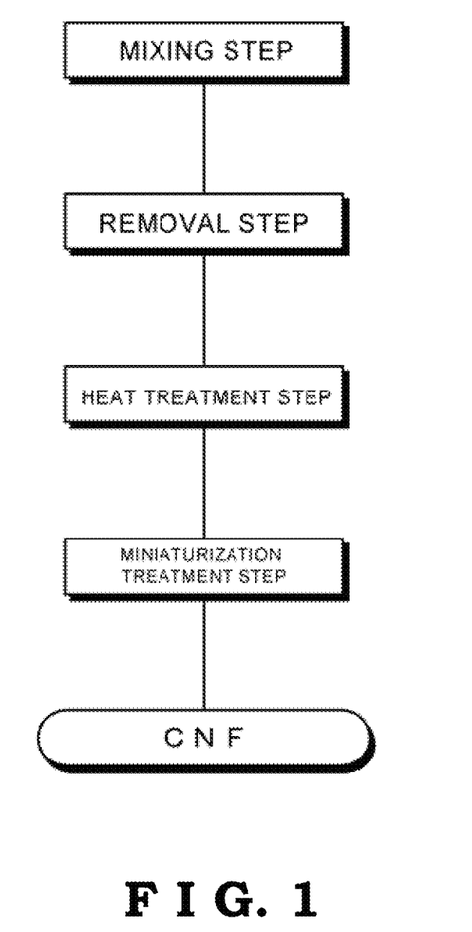
FIG. 1 is a flow diagram of a production method of fine cellulose fibers according to an embodiment of the present invention.

A production method of fine cellulose fibers according to an embodiment of the present invention comprises, as illustrated in FIG. 1, a mixing step, a removal step, a heat treatment step, and a miniaturization treatment step, in this order. It is to be noted that the steps other than the heat treatment and the miniaturization treatment are optional. Further, the mixing and the removal steps are steps in which a mixture to be used in the heat treatment step is prepared. Each step is described in the order of production.

Mixing Step

The mixing step is a step in which a plant raw material is mixed with urea or a urea derivative in a dispersion medium (the urea or the urea derivative may hereinafter be referred to as "urea or the like"). The mixing step can provide the mixture in which the plant raw material is mixed with the urea or the like with a high degree of homogeneity.

Examples of the plant raw material include wood, hemp, bagasse, kenaf, esparto, bamboo, chaff, straw, and the like. These plant raw materials can be used as is, but are preferably made into pulp from their fibers. The use of pulp can improve efficiency of the reaction with urea or the like in the heat treatment step. It is to be noted that the fiber diameters of the pulp are greater than 1 μm, and are typically no less than 10 μm and no greater than 100 μm.

Examples of the pulp include: chemical pulp, e.g., hardwood kraft pulp (LKP) such as hardwood bleached kraft pulp (LBKP) and hardwood unbleached kraft pulp (LUKP), needle-leaved kraft pulps (NKP) such as needle-leaved bleached kraft pulp (NBKP) and needle-leaved unbleached kraft pulp (NUKP); mechanical pulps, such as stone-ground pulp (SGP), pressurized stone-ground pulp (PGW), refiner-ground pulp (RGP), chemi-ground pulp (CGP), thermo-ground pulp (TGP), ground pulp (GP), thermomechanical pulp (TMP), chemi-thermomechanical pulp (CTMP), and bleached thermomechanical pulp (BTMP); recycled pulps produced from waste kraft paper, waste kraft envelopes, waste magazines, waste newspaper, waste flier paper, waste office paper, waste corrugated board, waste high-quality white paper, waste Kent paper, waste structural paper, waste pasteboard, waste groundwood paper, and the like; and deinked pulps (DIPs) produced by removing inks from waste paper pulps. The pulp may be used alone, or multiple kinds of pulp may be used in combination, as long as the effects of the invention are not impaired.

Of those pulps serving as the raw material of the fine cellulose fibers, the chemical pulp is preferred, and the LKP and NKP are more preferred in light of such reasons as enabling the composite to obtained with very high strength.

Examples of the urea derivative include biuret and a compound in which hydrogen atoms in thiourea or urea are substituted with alkyl groups.

The lower limit of the mixture ratio of the plant raw material such as pulp to the urea or the like (urea or the like/plant raw material) is preferably 10/100 by mass, and more preferably 20/100 by mass. On the other hand, the upper limit thereof is preferably 300/100 by mass, and more preferably 200/100 by mass. By setting the mixture ratio of the urea or the like to be no less than the lower limit, efficiently sufficient reactions can be carried out. Meanwhile, because the use of a large amount of the urea or the like hits a peak in the reaction efficiency, setting the mixture ratio of the urea or the like to be no greater than the upper limit can prevent production costs from increasing.

The dispersion medium is typically water, but other dispersion media such as alcohol and ether, or a mixture of water and another dispersion medium may be used.

In the mixing step, water may be added with the plant raw material and the urea or the like, an aqueous solution of the urea or the like may be added with the plant raw material, or a slurry containing the plant raw material (pulp slurry or the like) may be added with the urea or the like, for example. Further, after the addition, the mixtures may be stirred to mix the ingredients homogeneously. It is to be noted that the dispersion liquid containing the plant raw material and the urea or the like may further include other components.

Removal Step

The removal step is a step in which a dispersion medium is removed from the dispersion liquid containing the plant raw material and the urea or the like obtained in the mixing step. By removing the dispersion medium sufficiently, the urea or the like can be reacted efficiently in the following heat treatment step.

The removal is preferably performed by vaporizing the dispersion medium through heating. This can efficiently remove only the dispersion medium while leaving other components such as the urea or the like.

The lower limit of a heating temperature in the removal step in the case in which the dispersion medium is water is, for example, preferably 50° C., more preferably 70° C., and still more preferably 90° C. By setting the heating temperature to be no less than the lower limit, the dispersion medium can be efficiently vaporized, that is, removed. On the other hand, the upper limit of the heating temperature is, for example, 120° C., but it may also be 100° C.

The heating time in the removal step is not particularly limited as long as the dispersion medium is sufficiently removed (dried). It may appropriately be adjusted in accordance with the solid content concentration or the like in the dispersion liquid. The heating time may, for example, be no less than 6 hours and no greater than 24 hours.

Heat Treatment Step

The heat treatment step is a step in which a mixture of the plant raw material and the urea or the like are heat-treated. In the heat treatment step, at least a part of hydroxy groups in the cellulose, which is the principal component of the plant raw material, reacts with the urea or the like to be substituted with carbamate groups.

The lower limit of a heating temperature in the heat treatment step may be 120° C. or 130° C., for example, but is preferably no less than the melting point of the urea (approximately 134° C.) or 140° C., and is more preferably 150° C. By setting the heating temperature to be no less than the lower limit, the reaction of the cellulose with the carbamate groups can be carried out more efficiently. On the other hand, the upper limit of the heating temperature is 200° C., for example, but it may also be 180° C.

In addition, the lower limit of the heating temperature in the heat treatment step may, for example, be 15 minutes or 30 minutes, but is preferably 1 hour, more preferably 2 hours, still more preferably 3 hours, and yet more preferably 5 hours. By setting the heating temperature to be no less than the lower limit, the cellulose can be sufficiently reacted with the carbamate groups. On the other hand, the upper limit of the heating temperature is 15 hours, for example, but it may also be 10 hours.

The heat treatment step is preferably performed under an acidic condition. This can allow the reaction with the carbamate groups to proceed more effectively. The upper limit of the pH of the mixture in the heat treatment step is preferably 6, more preferably 5, and still more preferably 4. On the other hand, the lower limit of the pH is preferably 1, more preferably 2, and still more preferably 3. However, the heat treatment step on the other hand can be conducted under a neutral condition. The pH (degree of acidity or alkalinity) of the mixture can be adjusted, for example, by adding acidic compounds (for example, acetic acid, citric acid, or the like) and alkaline compounds (sodium hydroxide, calcium hydroxide, or the like) to the mixture. In addition, the heat treatment step may be carried out under an alkaline condition. This also enables the reaction with the carbamate groups to be carried out more effectively than doing so under a neutral condition. The pH in such an instance may be no less than 9 and no greater than 12, for example.

It is to be noted that the mixture after the heat treatment step may be washed. The mixture may be washed with water or the like. The washing can remove urea or the like that remains unreacted.

Miniaturization Step

The miniaturization step is a step in which the plant raw material (pulp or the like) reacted with the urea or the like in the heat treatment step is miniaturized. This defibrates the plant raw material, and fine cellulose fibers such as CNFs can be obtained.

The method of miniaturizing plant raw materials is not limited. Any known method can be used as long as the effects of the present invention are not impaired. For example, the plant raw material may be defibrated through mechanical treatment or through chemical treatment such as enzyme treatment and acid treatment.

Examples of the defibration method through mechanical treatment include: the grinder technique in which pulp is ground by rotating grinders; the counter-collision technique using a high-pressure homogenizer; the crushing technique using a ball mill, a roll mill, a cutter mill; or the like.

It is to be noted that, prior to the defibration through the mechanical treatment, the plant raw material may be preliminarily beaten. The method of the preliminary beating (mechanical pretreatment) is not particularly limited, and any known method can be used. Specific examples of the method include a method of using a refiner. In addition, the plant raw material may be chemically pre-treated prior to the defibration within a range not impairing the effects of the present invention.

Other Production Methods

The fine cellulose fibers may be produced through methods other than the methods described above. For example, after the plant raw material such as pulp is miniaturized to obtain the fine cellulose fibers, the fine cellulose fibers may be mixed with the urea or the like to be heat-treated. Alternatively, the plant raw material and the urea or the like in the dispersion liquid may be directly heated to a high temperature, and the dispersion medium removal step and the heating treatment step, which involves the reaction with the carbamate groups, may be carried out continuously or integrally, for example. In addition, the urea or the like and the plant raw material may be mixed in powder forms without using a dispersion medium such as water, and the heat treatment may be carried out on the mixture.

Slurry

A slurry according to an embodiment of the present invention comprises the fine cellulose fibers. The slurry is superior in handling properties due to such reasons as its relatively low viscosity. In addition, the slurry has relatively high drying efficiency because it uses fine cellulose fibers in which the hydroxy groups are substituted with the carbamate groups.

The slurry is a dispersion liquid of fine cellulose fibers formed by the fine cellulose fibers being dispersed in water. The slurry may include the fine cellulose fibers and components other than water. The content of the fine cellulose fibers in the slurry is not particularly limited, but it may be no less than 0.1% by mass and no greater than 10% by mass, for example.

The upper limit of a type B viscosity of the slurry may be 5,000 mPa·s, for example, and is preferably 4,000 mPa·s, more preferably 3,000 mPa·s, and still more preferably 2,500 mPa·s. In the fine cellulose fibers contained in the slurry, the hydroxy groups are substituted with the carbamate groups as described above. Thus, the slurry can keep the viscosity relatively low and have favorable handling properties. On the other hand, the lower limit of the type B viscosity may be 1,000 mPa·s, 1,500 mPa·s, or 2,000 mPa·s, for example.

Composite

A composite according to an embodiment of the present invention is a composite comprising the fine cellulose fibers and a resin. The composite comprises fine cellulose fibers comprising carbamate groups, and the fine cellulose fibers, due to its ability to be dispersed in resin with a high degree of homogeneity, can have high strength and the like.

Examples of the resin include polypropylene, polyolefins such as polyethylene, polyesters such as aliphatic polyester and aromatic polyester, polystyrene, methacrylate, acrylic resins such as acrylate, various types of thermoplastic resin such as polyamide, polycarbonate, and polyacetal, and rubbers such as styrene-butadiene rubber. The resin may be used alone, or two or more kinds of resin may be used in combination.

The mixing ratio of the fine cellulose fibers to the resin (fine cellulose fibers/resin) in the composite is not particularly limited, but it may be no less than 1/99 by mass and no greater than 40/60 by mass, for example. This can provide the composite with favorable strength and the like.

The composite may also contain components other than the fine cellulose fibers and the resin. Examples of the other components include a filler, an antistatic agent, a fire retardant, antimicrobials, a colorant, a radical scavenger, a foaming agent, a dispersant, and the like. The aforementioned dispersant may include acid-denatured polyolefin such as maleic acid polypropylene.

The composite may preferably further comprise a dispersant. The dispersant contains a resin affinity segment A and a cellulose affinity segment B and preferably has a block copolymer structure or a gradient copolymer structure.

The block copolymer structure is a structure in which two or more of high-molecular chains (segments) A, B, C, and the like with different properties (e.g., polarities) are bonded in a linear manner (e.g., A-B, A-B-A, and A-B-C). Examples include an A-B block copolymer structure, in which high-molecular chain A and high-molecular chain B are bonded in a linear manner. The block copolymer structure can be obtained by using known living polymerization.

Figure 2:
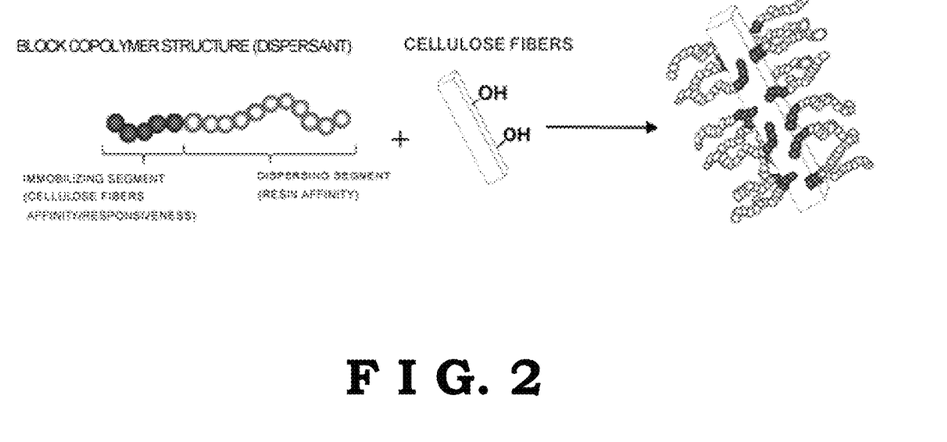
FIG. 2 is an explanatory diagram illustrating an example of a high-molecular dispersant, which is an optional component of a composite according to an embodiment of the invention.

The dispersant has a resin affinity segment A (dispersing segment) and a cellulose affinity segment B (immobilizing segment) and preferably is an A-B diblock copolymer. FIG. 2 illustrates a schematic of a high-molecular dispersant. The monomer units constituting the resin affinity segment A preferably have hydrophobic groups such as hydrocarbon groups. The hydrocarbon groups preferably are cyclic hydrocarbon groups. In addition, the number of carbon atoms in a hydrocarbon group is preferably no less than 3 and no greater than 20, and more preferably no less than 5 and no greater than 15, for example. The monomer units constituting the cellulose affinity segment B preferably have polar groups such as hydroxy groups, carboxy groups, and amino groups. Among these polar groups, the hydroxy groups are more preferred.

The monomer units constituting the resin affinity segment A and the cellulose affinity segment B are preferably vinyl monomer units, and more preferably comprise at least one monomer unit selected from a group consisting of (meth) acrylate-based monomers, (meth)acrylamide-based monomers, and styrene-based monomers.

The gradient copolymer structure is, taking a copolymer comprising repeating units derived from two types of monomers A and B with different properties (e.g., polarities) as an example, a structure with a repeating-unit distribution gradient, such that the proportion of unit A decreases as the proportion of unit B increases from one end of a high-molecular chain with an abundance of unit A to the other end with an abundance of unit B. The gradient copolymer structure may be obtained by using known living polymerization.

The surfaces of cellulose fibers, because of the presence of hydroxyl groups, are effectively coated with the cellulose affinity segment B, which is an A-B diblock copolymer or an A-B gradient copolymer. In addition, the resin affinity segment A in the A-B diblock copolymer or the A-B gradient copolymer hydrophobizes the surfaces of the cellulose fibers.

Examples of the method for mixing the fine cellulose fiber with a resin include: a kneading method using a kneading machine, such as a kneading machine (extruder), a bench-top roller, a Banbury mixer, a kneader, and a planetary mixer; a mixing method using an agitating blade; and a mixing method using a revolving or rotating agitator, or the like. The kneading machine (extruder) used is preferably a single-screw or multi-screw kneader, and more preferably a twin-screw kneader.

In the method of producing the composite, for example, preparation of fine cellulose fibers and dispersion of the fine cellulose fibers into a resin may be carried out in a single operation. This step may be a simultaneous nano-fibrillation compounding process (SFC process) of nano defibration (defibration to a nano level) and nano dispersion (dispersion at a nano level). In other words, the production method of the composite may include: performing a heat treatment on a mixture of a plant raw material (e.g. pulp) and urea or the like; and kneading the thermal treated plant raw material and a resin.

In other words, the production method of the composite may include: performing a heat treatment on a mixture of a plant raw material (e.g. pulp) and urea or the like; and kneading the thermal treated plant raw material and a resin.

The heat treatment step can adopt the method described above as a "production method of fine cellulose fibers." Prior to the heat treatment step, the mixing step and the removal step may be performed similarly to the "production method of fine cellulose fibers."

The kneading step may be performed, for example, by melt-kneading the mixture of the resin and the plant raw material, such as pulp, that has been heat-treated (urea-treated). The mixture can be obtained by mixing the treated pulp or the like with the dispersion medium and then with the resin, and vaporizing the dispersion medium therefrom. The dispersion medium is preferably an organic solvent, and more preferably an alcohol such as ethanol. The kneading provides a shearing force to the plant raw material, simultaneously promoting the mixing of the plant raw material with the resin and the miniaturization of the plant raw material. In other words, the kneading step may be an example of the miniaturization step in the "production method of fine cellulose fibers." The mixture having been through the kneading step can be made into a composite in a desired shape with a known molding method such as injection molding.

The composite can be used, for example, in: interior materials, exterior materials, and structural materials of automobiles, electric trains, marine vessels, and transportation equipment, such as airplanes; cases, structural materials, and inner parts of electric appliances, such as personal computers, televisions, telephones, and clocks; cases, structural materials, and inner parts of mobile communication equipment, such as mobile phones; cases, structural materials, and inner parts of portable music reproduction equipment, image reproduction equipment, printing equipment, photocopying machines, sporting goods, office equipment, toys, and sporting goods; building materials, interior decor materials such as furniture, exterior decor materials, and structural materials; office equipment such as stationery; and containers such as packages and trays, protective members, and partition members.

EXAMPLES

Hereinafter, the present invention is more specifically described by way of examples, but the present invention is not limited to the following examples.
Evaluation Methods Various types of physical properties described below were measured in accordance with the following evaluation methods.

Type B Viscosity (mPa·s)

The type B viscosity of the dispersion liquid of the fine cellulose fibers (mPa·s) was measured on a dispersion liquid of the fine cellulose fibers having a solid content concentration of 2% by mass, in accordance with "methods for viscosity measurement of liquid" of JIS-Z8803: 2011.

Zeta Potential (mV)

For the zeta potential (mV) of the fine cellulose fibers, streaming potential values were measured with a method of electrophoresis light scattering measurement using a zeta potentials measurement apparatus (model: SZP06 available from MUTEK).

Pulp Viscosity (cP)

The pulp viscosity of the fine cellulose fibers (cP) was measured in accordance with JIS-P8215:1998.

Water-Holding Capacity (%)

The water-holding capacity (%) of the fine cellulose fibers was measured in accordance with JAPAN TAPPI No. 26: 2000.

Tensile Modulus of Elasticity (GPa), Tensile Strength (MPa) The tensile modulus of elasticity and the tensile strength were measured on each test piece in accordance with JIS-K7171:2008.

Evaluations on the Urea content, Reaction time and Reaction Temperature

Production Example 1

Using water as a dispersion medium, the pulp was mixed with urea in a mass ratio of 100:40 (40% urea content with respect to 100% pulp). It was dried overnight at 105° C., thereafter heat treated at a reaction temperature of 140° C. for 1 hour of reaction time, and washed.

Production Examples 2 to 10

The similar method to that of Production Example 1 was used except that the urea content (the content with respect to 100% pulp: on mass basis), the reaction time, and reaction temperature used were as described in Table 1.

IR Measurement

The infrared spectra of the modified pulps obtained in Production Examples 1 to 10 were each measured in a bone-dry condition. The ratios of the peak heights that appeared in the proximity of 3,300 $cm^{-1}$ in the IR spectrum to the peak heights that appeared in the proximity of 1,715 $cm^{-1}$ (1,715 $cm^{-1}$/3,300 $cm^{-1}$ peak ratio) are listed in Table 1. In the IR spectrum, the peaks that appeared in the proximity of 1,715 $cm^{-1}$ are the peaks derived from the carbamate groups while the peaks that appeared in the proximity of 3,300 $cm^{-1}$ are the peaks derived from the hydroxy groups. In the case in which the peak ratio is high, it is concluded that the percentage of the hydroxy groups substituted with the carbamate groups is high. It is shown that increases in the urea content, the reaction time, and the reaction temperature increase the degree of substitution with the carbamate groups.

Measurement of Degree of Substitution

For the modified pulps obtained in Production Examples 4 to 10, the degrees of substitution with the carbamate groups with respect to the hydroxy groups were measured by the nitrogen quantitative determination with the Kjeldahl method. Table 1 shows the measurement results. It is shown that increases in the reaction time and the reaction temperature promote the substitution with the carbamate groups to a degree of substitution of approximately 0.4.

Relation of IR Spectrum with Degree of Substitution

For the obtained modified pulp, the correlation between the degrees of substitution (x) with the carbamate groups and the peak ratios (y) was observed; the degrees of substitution (x) with the carbamate groups having been calculated by the nitrogen quantitative determination with the Kjeldahl method, the peak ratios (y) being 1,715 cm$^{-1}$/3,300 cm$^{-1}$ in the IR spectrum. It was confirmed that the degrees of substitution (x) with the carbamate groups and the peak ratios (y) have a high correlation.

TABLE 1

|  | Urea content | Reaction time | Reaction temperature | 1715 cm$^{-1}$/3300 cm$^{-1}$ Peak ratio | Degree of substitution with carbamate groups |
| --- | --- | --- | --- | --- | --- |
| Production Example 1 | 40% | 1 hour | 140° C. | 0.19 | — |
| Production Example 2 | 40% | 2 hours | 140° C. | 0.35 | — |
| Production Example 3 | 40% | 4 hours | 140° C. | 0.59 | — |
| Production Example 4 | 40% | 6 hours | 140° C. | 0.72 | 0.26 |
| Production Example 5 | 100% | 1 hour | 140° C. | 0.22 | 0.06 |
| Production Example 6 | 100% | 2 hours | 140° C. | 0.47 | 0.13 |
| Production Example 7 | 100% | 4 hours | 140° C. | 0.72 | 0.29 |
| Production Example 8 | 100% | 6 hours | 140° C. | 0.89 | 0.37 |
| Production Example 9 | 100% | 4 hours | 130° C. | 0.61 | 0.21 |
| Production Example 10 | 100% | 4 hours | 150° C. | 0.88 | 0.37 |

Evaluation on pH During Heat Treatment

Production Examples 11 to 13

Using water as a dispersion medium, the pulp was mixed with urea in a mass ratio of 100:40, and citric acid or sodium hydroxide was added thereto to adjust the pHs (Production Example 11: pH 11.3, Production Example 12: pH 7.9, Production Example 13: pH 3.6). The mixture was dried overnight at 105° C., thereafter heat treated at a reaction temperature of 140° C. for 4 hours of reaction time, and washed.

IR Measurement

The infrared spectra of the modified pulps obtained in Production Examples 11 to 13 were each measured in a bone-dry condition. The ratios of the peak heights that appeared in the proximity of 3,300 cm$^{-1}$ in the IR spectrum to the peak heights that appeared in the proximity of 1,715 cm$^{-1}$ (1,715 cm$^{-1}$/3,300 cm$^{-1}$ peak ratio) are listed in Table 2. It is shown that performing heat treatment under an alkali or acidic condition, particularly under the acidic condition, increases the degree of substitution with the carbamate groups.

TABLE 2

|  | Urea content | Reaction time | Reaction temperature | pH | 1715 cm$^{-1}$/3300 cm$^{-1}$ Peak ratio |
| --- | --- | --- | --- | --- | --- |
| Production Example 11 | 40% | 4 hours | 140° C. | 11.31 | 0.85 |
| Production Example 12 | 40% | 4 hours | 140° C. | 7.83 | 0.78 |
| Production Example 13 | 40% | 4 hours | 140° C. | 3.64 | 0.98 |

Evaluation on Number of Treatments

Production Example 14

Using water as a dispersion medium, the pulp was mixed with urea in a mass ratio of 100:40. It was dried overnight at 100° C., thereafter heat treated at a reaction temperature of 140° C. for 4 hours of reaction time, and washed.

Production Example 15

The operation of Production Example 14 was repeated two times. In other words, following Production Example 14, the pulp was mixed with urea in a mass ratio of 100:40, with water being a dispersion medium. It was dried overnight at 105° C., thereafter heat treated at a reaction temperature of 140° C. for 4 hours of reaction time, and washed.

Production Example 16

The operation of Production Example 14 was repeated three times.

IR Measurement

The infrared spectra of the modified pulps obtained in Production Examples 14 to 16 were each measured in a bone-dry condition. The ratios of the peak heights appeared in the proximity of 3,300 cm$^{-1}$ in the IR spectrum to the peak heights appeared in the proximity of 1,715 cm$^{-1}$ (1,715 cm$^{-1}$/3,300 cm$^{-1}$ peak ratio) are listed in Table 3. It is shown that increasing number of treatments increases the degree of substitution with the carbamate groups.

TABLE 3

|  | Urea content | Reaction time | Reaction temperature | Number of treatments | 1715 cm$^{-1}$/3300 cm$^{-1}$ Peak ratio |
| --- | --- | --- | --- | --- | --- |
| Production Example 14 | 40% | 4 hours | 140° C. | 1 | 0.59 |
| Production Example 15 | 40% | 4 hours | 140° C. | 2 | 1.01 |
| Production Example 16 | 40% | 4 hours | 140° C. | 3 | 1.08 |

Example 1

Figure 3:
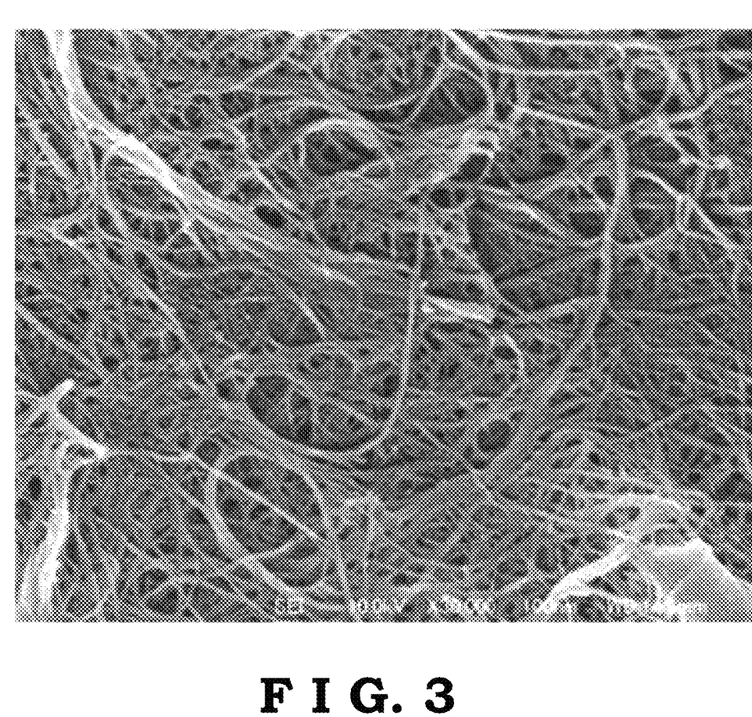
FIG. 3 is an SEM image of fine cellulose fibers obtained in Example 1.

The modified pulp obtained in Production Example 8 was treated with a refiner for a preliminary beating, and then defibrated (miniaturized) with a high-pressure homogenizer to obtain a slurry of fine cellulose fibers comprising carbamate groups. It is to be noted that the refiner treatment and the high-pressure homogenizer treatment were cycled multiple times. FIG. 3 is an SEM image of fine cellulose fibers in Example 1 contained in the obtained slurry. The SEM image shows that fine cellulose fibers have been obtained.

Comparative Example 1

Figure 4:
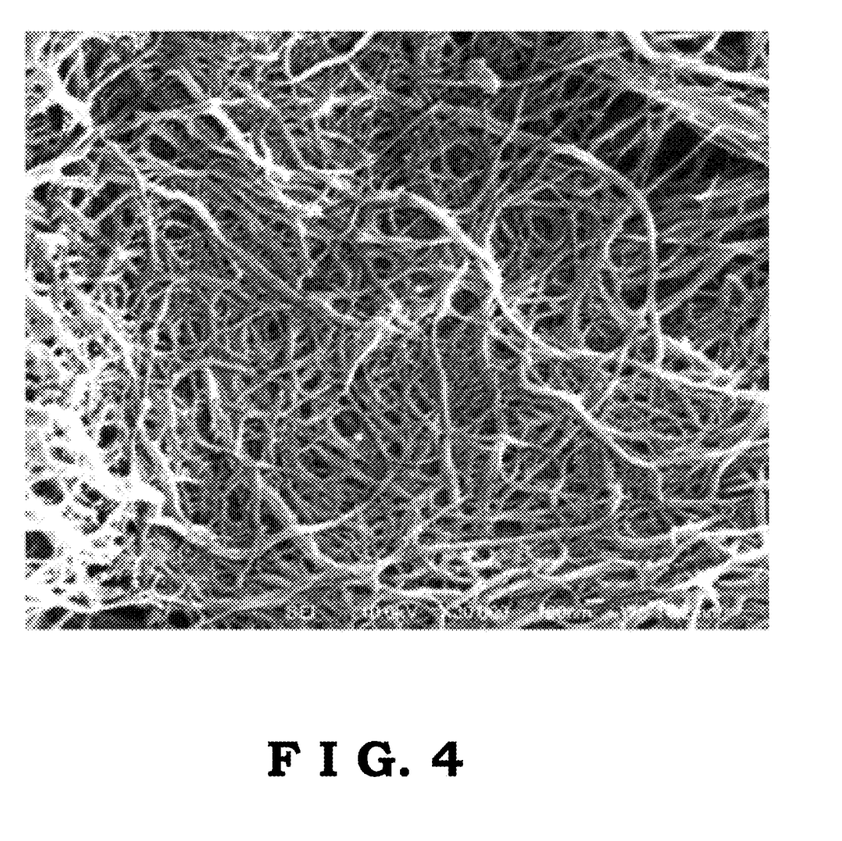
FIG. 4 is an SEM image of fine cellulose fibers obtained in Comparative Example 1.

Fine cellulose fibers according to Comparative Example 1 were obtained in a similar manner to that of Example 1 except that the non-modified pulp was used in place of the modified pulp. FIG. 4 is an SEM image of fine cellulose fibers obtained through Comparative Example 1.

Evaluations

The obtained fine cellulose fibers were measured, with the aforementioned methods, in type B viscosity, zeta potential, pulp viscosity, and water-holding capacity. The results are shown in Table 4.

TABLE 4

|  |  | Example 1 | Comparative Example 1 |
| --- | --- | --- | --- |
| Type B viscosity | mPa · s | 2,260 | 6,000 |
| Zeta potential | mV | −57 | −38 |
| Pulp viscosity | cP | 4.2 | 4.3 |
| Water-holding capacity | % | 296 | 316 |

As illustrated in Table 4, it is shown that the fine cellulose fibers in Example 1 have a lower type B viscosity and water-holding capacity and are superior in handling properties.

Example 2

Using the modified pulp obtained in Production Example 8 as a reinforcing material, a composite of fine cellulose fiber-reinforced resin was obtained by a simultaneous process of nano defibration and nano dispersion (SFC process) in accordance with the following procedure.

(1) Adjustment of Premix

Water in the modified pulp dispersion liquid was replaced with ethanol to give an ethanol-replaced modified pulp dispersion liquid. The ethanol-replaced modified pulp dispersion liquid was mixed with high-density polyethylene (HDPE) (Flo-Beads HE-3040 available from Sumitomo Seika) in a ratio of 3.3:4.9 (w/w) in solid content equivalent, and then dried under reduced pressure (60° C.) to obtain a modified pulp/resin premix.

(2) Preparation of Composite

The obtained premix was diluted with HDPE (SUNTEC-HD J320 available from Asahi Kasei Chemicals) so that the concentration of the cellulose portion in the modified pulp became 10% by mass. It was then melt-kneaded under the following conditions and inject-molded under the following conditions to obtain the composite of Example 2. It is to be noted that the cellulose portion in the modified pulp refers to the portion of the raw material equivalent to pulp, which does not include the urea-modified portion. In other words, the concentration of the cellulose portion in the modified pulp refers to the concentration converted into the raw material pulp (the same applies to the following).

Kneading Conditions

Kneading equipment: Xplore MC15K available from Xplore Instruments

Kneading conditions: Twin-screw, number of revolutions 200 rpm, kneading time 60 mins, kneading temperature 140° C.

Injection Molding Conditions

Injection molding machine: IM12K available from Xplore Instruments

Molding temperature: 150° C.

Metal mold temperature: 50° C.

Injection pressures: 10 bar/5 s to 13 bar/32 s

Comparative Example 2

A composite of Comparative Example 2 was obtained in a similar manner to that of Example 2 except that the non-modified pulp was used in place of the modified pulp.

Evaluations

The composites obtained in Example 2 and Comparative Example 2 were measured in tensile modulus of elasticity and tensile strength in accordance with the aforementioned methods. The results are shown in Table 5.

TABLE 5

|  |  | Example 2 | Comparative Example 2 |
|---|---|---|---|
| Pulp |  | Modified pulp | Non-modified pulp |
| Replacement with ethanol |  | Yes | Yes |
| Dispersant |  | No | No |
| Tensile modulus of elasticity | Gpa | 1.4 | 1.3 |
| Tensile strength | Mpa | 25.7 | 24.2 |

Example 3

The composite of Example 3 was obtained in a similar manner to that of Example 2 except that a ratio of 6 parts by mass of maleic acid modified polypropylene (MAPP) (TOYO-TACK PMA H-1100P available from Toyobo Co., Ltd.), serving as a dispersant, to 10 parts by mass of the cellulose portion of the modified pulp was added to the obtained premix and diluted with HDPE such that the concentration of the cellulose portion of the modified pulp became 10% by mass.

Example 4

The composite of Example 4 was obtained in a similar manner to that of Example 3 except that a following high-molecular dispersant was used for the obtained premix. The following illustrates a chemical structure of the high-molecular dispersant.

Chemical 1

The high-molecular dispersant is a diblock copolymer in which the resin affinity segment A is poly(dicyclo pentenyl oxyethyl methacrylate), and the cellulose affinity segment B is poly(2-hydroxyethyl methacrylate). The number average molecular weight ($M_n$) of the A chain calculated with the GPC was 5,000, the molecular weight distribution index $M_w/M_n$ calculated with the GPC was 1.4, the Mn as a whole calculated with NRM was 7,500, and the ratio of A to B in the degree of polymerization was 19:19.

Comparative Example 3

A composite of Comparative Example 3 was obtained in a similar manner to that of Example 3 except that the non-modified pulp was used in place of the modified pulp.

Evaluations

Figure 5:
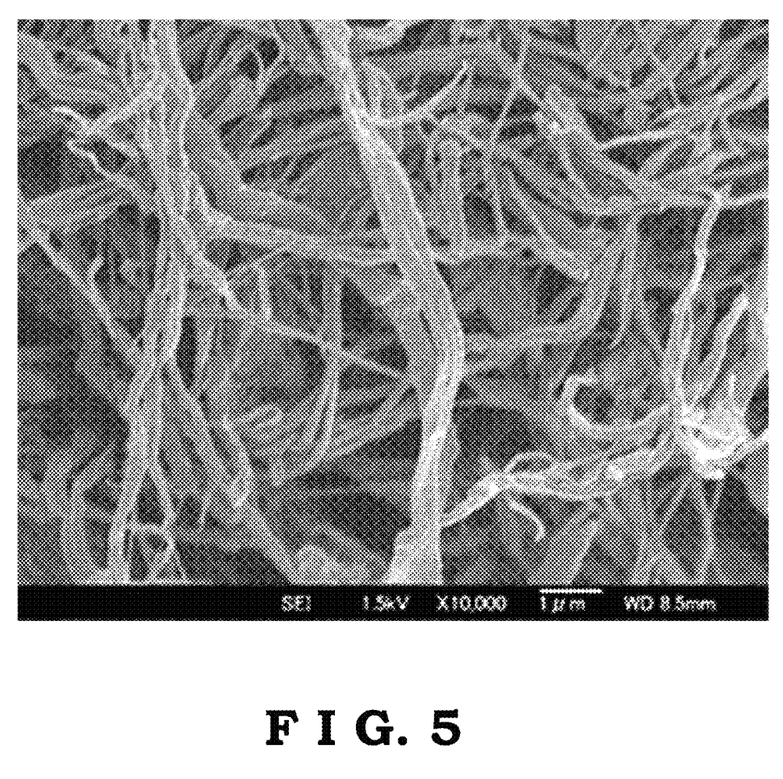
FIG. 5 is an SEM image of fine cellulose fibers obtained in Example 4.

The composites having been obtained in Examples 3, 4 and Comparative Example 3 were measured in tensile modulus of elasticity and tensile strength in accordance with the aforementioned methods. The results are shown in Table 6. In addition, FIG. 5 shows an SEM image of the fine cellulose fibers that was obtained by removing the HDPE portion from the composite obtained in Example 4 with a thermal xylene extraction.

TABLE 6

|  |  | Example 3 | Example 4 | Comparative Example 3 |
|---|---|---|---|---|
| Pulp |  | Modified pulp | Modified pulp | Non-modified pulp |
| Replacement with ethanol |  | Yes | Yes | Yes |
| Dispersant |  | MAPP | Polymer dispersant [Chemical 1] | MAPP |
| Tensile modulus of elasticity | Gpa | 1.2 | 1.8 | 1.1 |
| Tensile strength | Mpa | 28.8 | 32.9 | 27.6 |

Example 5

A composite of Example 5 was obtained in a similar manner to that of Example 3 except that, when adjusting the premix, water in the dispersion liquid of the modified pulp was mixed with HDPE instead of being substituted with ethanol.

Comparative Example 4

A composite of Comparative Example 4 was obtained in a similar manner to that of Example 5 except that the non-modified pulp was used in place of the modified pulp.

Evaluations

The composites having been obtained in Example 5 and Comparative Example 4 were measured in tensile modulus of elasticity and tensile strength in accordance with the aforementioned methods. The results are shown in Table 7.

TABLE 7

|  |  | Example 5 | Comparative Example 4 |
|---|---|---|---|
| Pulp |  | Modified pulp | Non-modified pulp |
| Replacement with ethanol |  | No | No |
| Dispersant |  | MAPP | MAPP |
| Tensile modulus of elasticity | Gpa | 1.3 | 1.2 |
| Tensile strength | Mpa | 28.2 | 27.7 |

As illustrated in Tables 5 to 7, it is shown that dispersing fine cellulose fibers containing carbamate groups using the urea-treated modified pulp can attain higher tensile modulus of elasticity and tensile strength compared with the case that uses non-modified pulp.

INDUSTRIAL APPLICABILITY

The fine cellulose fibers and the production method thereof according to the present invention can be suitably used as a reinforcing material or the like for a resin and as a production method thereof.

The invention claimed is:

1. A fine cellulose fiber comprising a carbamate group,
wherein the carbamate group is a group represented by —O—CO—NH2, —O—CO—NHR, or —O—CO—NR2, wherein R each independently represents a saturated linear hydrocarbon group, a saturated branched-chain hydrocarbon group, a saturated cyclic hydrocarbon group, an unsaturated linear hydrocarbon group, an unsaturated branched-chain hydrocarbon group, an aromatic group, or a group derived therefrom,
wherein the fine cellulose fiber is obtained by defibrating a plant raw material; and
an average fiber diameter of the fine cellulose fiber is 2 nm to 10 μm, and an average length of the fine cellulose fiber is no less than 1 μm and no greater than 5,000 μm,
a zeta potential is no less than −100 and no greater than −30 mV,
a freeness is no greater than 100 cc,
a pulp viscosity is no less than 2 and no greater than 15 cP,
the fine cellulose fiber exhibits a single peak on a pseudo particle size distribution curve obtained by a measurement with a laser diffraction method in a state of having been dispersed in water, a particle diameter of the fine cellulose fiber with the single peak being no less than 5 and no greater than 50 μm, and
a degree of substitution with the carbamate group with respect to hydroxy groups is no less than 0.05 and no greater than 0.5.

2. A slurry comprising the fine cellulose fiber according to claim 1.

3. A composite comprising a resin and the fine cellulose fiber according to claim 1.

4. A production method of a fine cellulose fiber comprising a carbamate group, the method comprising:

mixing a plant raw material and urea or a urea derivative in a dispersion medium to obtain a dispersion liquid;
removing the dispersion medium by heating the dispersion liquid to obtain a mixture of the plant raw material and the urea or the urea derivative;
performing a heat treatment on the mixture; and
performing a miniaturization treatment of the plant raw material in the mixture subjected to the heat treatment, the fine cellulose fiber is obtained by defibrating the plant raw material;
wherein the carbamate group is a group represented by —O—CO—NH2, —O—CO—NHR, or —O—CO—NR2, wherein R each independently represents a saturated linear hydrocarbon group, a saturated branched-chain hydrocarbon group, a saturated cyclic hydrocarbon group, an unsaturated linear hydrocarbon group, an unsaturated branched-chain hydrocarbon group, an aromatic group, or a group derived therefrom,
a average fiber diameter of the fine cellulose fiber is 2 nm to 10 μm, and a average length of the fine cellulose fiber is no less than 1 μm and no greater than 5,000 μm,
a zeta potential is no less than −100 and no greater than −30 mV,
a freeness is no greater than 100 cc,
a pulp viscosity is no less than 2 and no greater than 15 cP,
the fine cellulose fiber exhibits a single peak on a pseudo particle size distribution curve obtained by a measurement with a laser diffraction method in a state of having been dispersed in water, a particle diameter of the fine cellulose fiber with the single peak being no less than 5 and no greater than 50 μm, and
a degree of substitution with the carbamate group with respect to hydroxy groups is no less than 0.05 and no greater than 0.5.

5. The production method of a fine cellulose fiber according to claim 4, wherein the heat treatment is performed at no less than 120° C. and no greater than 200° C.

6. The production method of a fine cellulose fiber according to claim 4, wherein the heat treatment is performed under an acidic condition.

7. The production method of a fine cellulose fiber according to claim 4, wherein the fine cellulose fiber is used as a reinforcing material for a resin.

* * * * *